(12) United States Patent
Yamashita et al.

(10) Patent No.: US 8,959,088 B2
(45) Date of Patent: Feb. 17, 2015

(54) LOG MANAGEMENT METHOD, LOG MANAGEMENT SYSTEM, AND INFORMATION PROCESSING APPARATUS

(71) Applicant: Fujitsu Limited, Kawasaki-shi, Kanagawa (JP)

(72) Inventors: Kenichi Yamashita, Yokohama (JP); Hidehiko Ino, Yokohama (JP); Kazuo Mineno, Inagi (JP); Kouichi Hidaka, Kawasaki (JP); Hideaki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 13/722,191

(22) Filed: Dec. 20, 2012

(65) Prior Publication Data

US 2013/0262487 A1    Oct. 3, 2013

(30) Foreign Application Priority Data

Mar. 30, 2012    (JP) .................................. 2012-083270

(51) Int. Cl.
*G06F 7/00*         (2006.01)
*G06F 17/30*        (2006.01)
*G06F 11/30*        (2006.01)

(52) U.S. Cl.
CPC ...... *G06F 17/30115* (2013.01); *G06F 11/3082* (2013.01); *G06F 2201/865* (2013.01)
USPC ........................................................ 707/736

(58) Field of Classification Search
USPC ......................................................... 707/736
See application file for complete search history.

(56) References Cited

U.S. PATENT DOCUMENTS

2010/0042975 A1    2/2010   Schneider et al.
2013/0103982 A1*   4/2013   Chelliah et al. .................. 714/20

FOREIGN PATENT DOCUMENTS

JP    7-271648      10/1995
JP    2008-15870    1/2008
JP    2010-044747   2/2010

* cited by examiner

*Primary Examiner* — James Trujillo
*Assistant Examiner* — Jeffrey Chang
(74) *Attorney, Agent, or Firm* — Staas & Halsey LLP

(57) ABSTRACT

A log management method includes extracting, before deploying an application which compresses and outputs log information of the application, message format information concerning the log information from source code of the application, deploying the application, and outputting the log information in a form of a message based on the message format information when a device that is able to obtain the log information output from the deployed application obtains the log information.

3 Claims, 13 Drawing Sheets

FIG. 2

```
    ⋮
DICTIONARY REGISTRATION FUNCTION (001, "<@TIME>:EXECUTION OF <@ID> HAS SUCCEEDED");
DICTIONARY REGISTRATION FUNCTION (002, "<@TIME>:EXECUTION OF <@ID> HAS FAILED");
    ⋮
```

FIG. 3

| DICTIONARY ID | YYY | |
|---|---|---|
| LOG ID | COMPRESSION FORMAT | DECOMPRESSION FORMAT |
| 001 | TIME, ID | <@TIME>:EXECUTION OF <@ID> HAS SUCCEEDED |
| 002 | TIME, ID | <@TIME>:EXECUTION OF <@ID> HAS FAILED |
| : | : | : |

FIG. 4

| ID | CHARACTER STRING |
|---|---|
| E1 | MSG-ID-00001 |
| E2 | MSG-ID-00002 |
| : | : |
| Exx | MSG-ID-0000n |

FIG. 5

| DICTIONARY ID | YYY |
|---|---|
| LOG ID | PARAMETER |
| 001 | AAA、BBB、002 |
| 002 | "USER ID"、XXX |
| : | : |

LOG MANAGEMENT METHOD, LOG MANAGEMENT SYSTEM, AND INFORMATION PROCESSING APPARATUS

CROSS-REFERENCE TO RELATED APPLICATION

This application is based upon and claims the benefit of priority of the prior Japanese Patent Application No. 2012-83270, filed on Mar. 30, 2012, the entire contents of which are incorporated herein by reference.

FIELD

The embodiments discussed herein are related to a log management method, a log management system, and an information processing apparatus.

BACKGROUND

A device, such as a server, for writing log information, such as execution results of an application, into a log file while executing the application is known. Such a device executes processing, by using an application, for storing log information in a memory, reading the log information stored in the memory, and writing the read log information into a log file. In this case, the timing at which processing for storing log information in the memory is executed and the timing at which processing for writing the log information stored in the memory into the log file is executed is asynchronous. Accordingly, regardless of processing results of writing log information into the log file, processing for storing log information in the memory can be executed independently. Thus, a series of log output processing operations executed by an application, such as processing for storing log information in a memory and processing for reading the log information stored in the memory and writing the log information into a log file is accelerated.

Examples of the above-described related art are disclosed in Japanese Laid-open Patent Publication Nos. 7-271648, 2010-44747, and 2008-15870.

SUMMARY

According to an aspect of the invention, a log management method includes extracting, before deploying an application which compresses and outputs log information of the application, message format information concerning the log information from source code of the application, deploying the application, and outputting the log information in a form of a message based on the message format information when a device that is able to obtain the log information output from the deployed application obtains the log information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates examples of dictionary registration functions;

FIG. 3 illustrates an example of the data structure of a dictionary;

FIG. 4 illustrates an example of the data structure of a fixed character dictionary;

FIG. 5 illustrates an example of the data structure of a log file;

DESCRIPTION OF EMBODIMENTS

Figure 1:
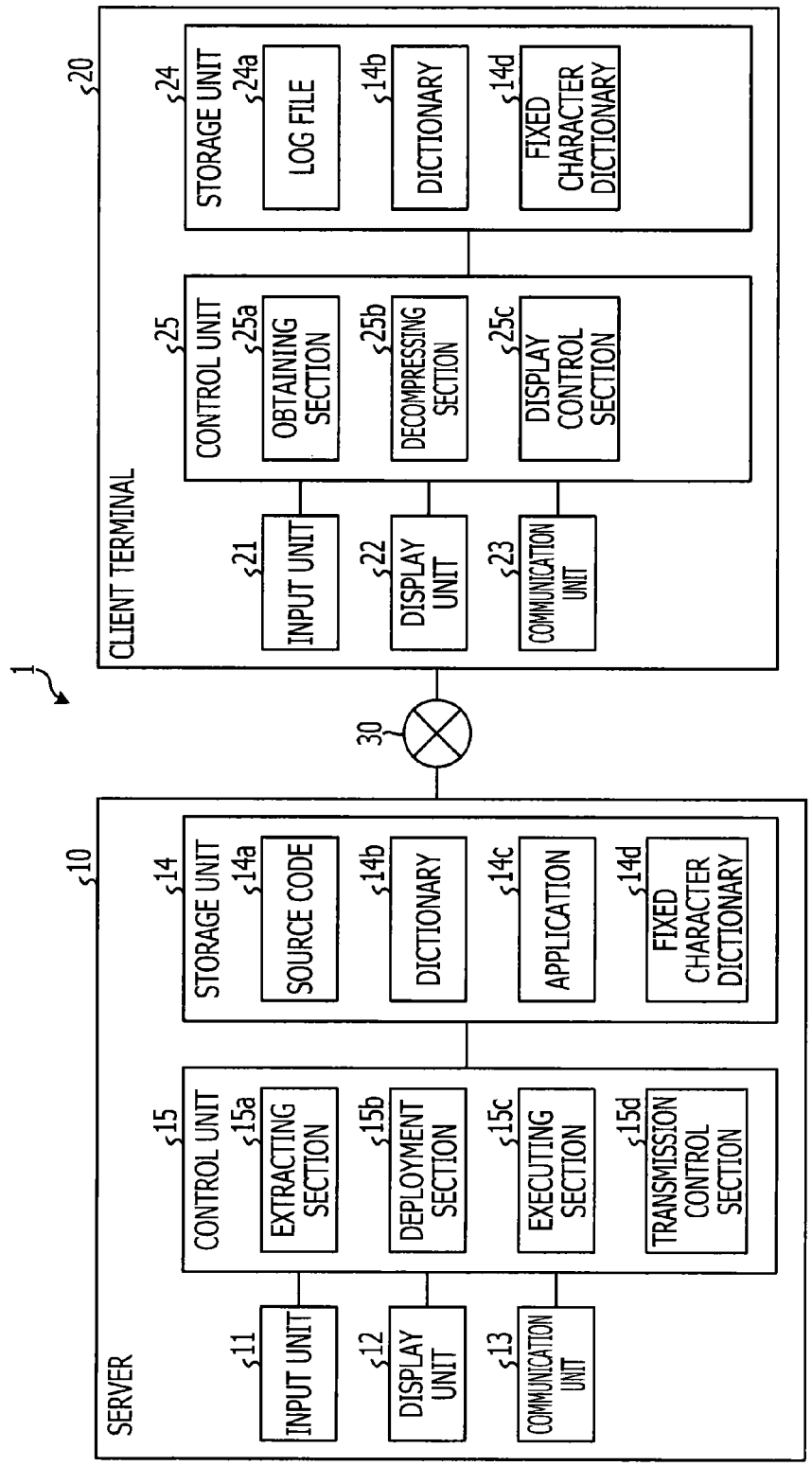
FIG. 1 illustrates an example of the system configuration of a log management system according to an embodiment.

First of all, the occurrence of a delay in log output processing will be described below by way of discussion about the related art.

There is a client terminal that causes a device that executes an application, such as that described above, to execute an application so as to obtain execution results. As the number of such client terminals increases, the number of times the device executes processing for storing log information in a memory also increases. In this case, therefore, the size of log information stored in the memory becomes large, and the speed at which processing for storing log information in the memory is executed may be decreased.

Additionally, since many items of log information are stored in the memory, when executing processing for writing log information stored in the memory into a log file, the number of times of access made to the log file increases, and accordingly, the number of times of access made to a device, such as a server, in which the log file is stored also increases. Thus, in a device for writing log information into the log file, a delay in writing log information into the log file occurs, which may further cause a delay in reading log information from the memory.

Accordingly, in order to accelerate log output processing, various methods, such as those described below, may be considered. For example, when executing processing for writing log information into a log file, a device which executes an application, such as that described above, may compress the log information and send the compressed log information to a device in which a log file is stored, thereby writing the log information into the log file. In this case, however, when writing log information into the log file, the device which executes an application compresses the log information, thereby causing a delay in executing processing. Accordingly, it is not possible to accelerate log output processing by using this method.

Additionally, when executing processing for storing log information in a memory, the above-described device which executes an application may compress the log information and store it in a memory. The device may then execute processing for reading the compressed log information from the memory, decompressing it, and writing it into a log file. In this case, however, when executing processing for writing log information into the log file, the device has to compress and decompress the log information, thereby causing a delay in processing. Accordingly, it is not possible to accelerate log output processing by using this method, as well as the above-described method.

Moreover, when executing processing for storing log information in a memory, a device which executes an application, such as that described above, may compress the log information, store it in a memory, and then may execute the following processing. The device may execute processing for decompressing the log information stored in the memory, determining a destination to which the log information will be output, compressing the log information again, and then writing the compressed log information into a log file of the destination. In this case, however, complicated processing, such as compressing, decompressing, and then compressing log information again, is executed, thereby causing a delay in processing. Accordingly, it is not possible to accelerate log output processing by using this method, as well as the above-described methods.

Further, when executing processing for storing log information in a memory, a device which executes an application, such as that described above, may compress log information by using a dictionary, store the compressed log information in the memory together with the dictionary, and then execute the following processing. The device may execute processing for reading the compressed log information and the dictionary stored in the memory, and then writing the read log information and dictionary into a log file. However, the data size of the dictionary is large, and in this case, too, the size of data stored in the memory increases, which may decrease a speed at which processing for storing log information in the memory is executed. Additionally, since the data size of the log information and the dictionary is large, there may be a delay in writing the log information into the log file, which may also cause a delay in reading the log information from the memory. Accordingly, it is not possible to accelerate log output processing by using this method, as well as the above-described methods.

A detailed description will be given below, with reference to the accompanying drawings, of embodiments of a log management method, a log management system, and an information processing apparatus. It is to be understood that the embodiments do not restrict the disclosed technology.

A log management system of an embodiment will be described below. FIG. 1 illustrates an example of the system configuration of a log management system 1 of this embodiment. The log management system 1 includes, as illustrated in FIG. 1, a server 10 and a client terminal 20. The server 10 and the client terminal 20 are connected to each other via a network 30.

Configuration of Server

The server 10 is a computer including, as illustrated in FIG. 1, an input unit 11, a display unit 12, a communication unit 13, a storage unit 14, and a control unit 15.

The input unit 11 inputs information to the control unit 15. For example, in response to an instruction from a user, the input unit 11 inputs instructions to execute various processing operations to the control unit 15. An example of a device of the input unit 11 is a keyboard or a mouse.

The display unit 12 displays various images under the control of the control unit 15.

The communication unit 13 performs communication between the server 10 and the client terminal 20. For example, upon receiving log information compressed by an application executed by an executing section 15c, which will be discussed later, the communication unit 13 sends the received log information to the client terminal 20 via the network 30. Upon receiving a dictionary 14b, which will be discussed later, sent from a transmission control section 15d, which will be discussed later, the communication unit 13 sends the received dictionary 14b to the client terminal 20 via the network 30.

The storage unit 14 stores therein various programs executed by the control unit 15. The storage unit 14 also stores therein source code 14a. The storage unit 14 also stores therein the dictionary 14b generated by an extracting section 15a, which will be discussed later. The storage unit 14 also stores therein an application 14c generated by a deployment section 15b, which will be discussed later. The storage unit 14 also stores therein a fixed character dictionary 14d.

The source code 14a is source code of the application 14c, which is written by, for example, a developer developing the application 14c. The source code 14a includes instructions which define various processing operations. For example, the source code 14a includes instructions which define processing for storing parameters, which will be discussed later, in an internal memory of the control unit 15. The source code 14a also includes instructions which define processing for performing control so that the parameters stored in the internal memory are read and sent to the client terminal 20. The parameters are compressed log information. The timing at which processing for storing the parameters in the internal memory is executed and the timing at which processing for sending the parameters stored in the internal memory to the client terminal 20 is executed are asynchronous. Accordingly, regardless of processing results of executing processing for sending the parameters to the client terminal 20, processing for storing parameters in the internal memory may be executed. Thus, a series of processing operations executed by the application 14c for outputting parameters, i.e., a compressed log, such as storing parameters in the internal memory and reading the parameters stored in the internal memory and sending them to the client terminal 20, is accelerated.

An example of other instructions included in the source code 14a will be discussed below. For example, the source code 14a includes dictionary registration functions, which are written by, for example, a developer. An example of the format of the dictionary registration functions is "dictionary registration function (log ID, 'format string')". The format string is a character string of the format of a log indicated by a log ID.

The format string includes a position at which a parameter is embedded in the format string of a log and also includes a special character indicating the compression method of the parameter. In the following description, in the format string of a log, character strings other than a special character may be referred to as fixed strings. The special character is represented by "<@X>" in which a character string "X" specifying the compressing method of a parameter is interposed between symbols "<@" and ">". For example, if the format string is "AB<@X>CD", "AB<@X>CD" indicates that a parameter compressed by the compression method represented by "X" is embedded between a fixed string "AB" and a fixed string "CD".

FIG. 2 illustrates examples of dictionary registration functions. In the examples illustrated in FIG. 2, the source code 14a includes a dictionary registration function (001, "<@TIME>: EXECUTION OF <@ID> HAS SUCCEEDED") and a dictionary registration function (002, "<@TIME>: EXECUTION OF <@ID> HAS FAILED").

The character string "TIME" indicates the compression method for compressing a parameter indicating the time. In this case, the difference between the time embedded in the special character <@TIME> corresponding to "TIME" at a current position to be compressed and the time embedded in the special character <@TIME> located at the previous position in the source code 14a is used as the parameter indicating the time. For example, it is now assumed that the time embedded in the special character <@TIME> located at the previous position is "12:11:20, January 30, 2012". In this case, if the parameter to be compressed indicates the time "12:11:50, January 30, 2012", the parameter indicating the time takes a value "30", which indicates the time difference (30 seconds). In this manner, the time difference value is used as the parameter indicating the time, thereby making it possible to compress the size of the parameter indicating the time.

The character string "ID" indicates a compression method for compressing a character string by using an ID associated with the character string as a parameter, instead of using the character string itself as a parameter. The ID is registered in a fixed character dictionary 14d, which will be discussed later. For example, it is assumed that the ID of a character string "MSG-ID-00001" is "E1". In this case, if a parameter to be compressed indicates a character string "MSG-ID-00001", the ID "E1" is used as the parameter indicating the character string. In this manner, the ID is used as a parameter indicating a character string associated with the ID, thereby making it possible to compress the size of the parameter indicating the character string.

The type of character string that specifies the compression method of a parameter may be other than the types described above. For example, the character string "SERIAL_NUMBER" indicates the compression method for compressing a parameter indicating a numeric value. In this case, the difference between a numeric value embedded in a special character <@SERIAL_NUMBER> corresponding to "SERIAL_NUMBER" at a current position to be compressed and a numeric value embedded in a special character <@SERIAL_NUMBER> located at the previous position in the source code 14a is used as the parameter indicating a numeric value. For example, it is now assumed that the numeric value embedded in the special character <@SERIAL_NUMBER> located at the previous position is "50". In this case, if the parameter to be compressed indicates the numeric value "55", the parameter indicating the numeric value takes a value "5", which indicates the difference value. In this manner, the difference value is used as the parameter indicating a numeric value, thereby making it possible to compress the size of the parameter indicating the numeric value.

The dictionary 14b will be discussed below. FIG. 3 illustrates an example of the data structure of the dictionary 14b. The dictionary 14b illustrated in FIG. 3 is generated for each application 14c, which will be discussed below. In the example illustrated in FIG. 3, the dictionary 14b includes a field "dictionary ID" in which a dictionary ID, which is an ID for identifying a dictionary, is registered by the extracting section 15a, which will be discussed below. In the example illustrated in FIG. 3, the dictionary 14b also includes fields "log ID", "compression format", and "decompression format". In the field "log ID", the log ID, which is an ID of a log, is registered by the extracting section 15a. In the field "compression format", a character string which specifies the compression method of a parameter included in a specific character which is extracted from the format string of a dictionary registration function by the extracting section 15a. In the field "decompression format", the format string of a dictionary registration function is registered by the extracting section 15a. The dictionary 14b is used when compressing log information by the application 14c which is executed by the executing section 15c.

The application 14c is generated as a result of compiling the source code 14a by using the deployment section 15b, which will be discussed below. The application 14c is executed by the executing section 15c, which will be discussed below. The application 14c then executes processing for storing parameters in the internal memory of the control unit 15. The application 14c also executes processing for reading the parameters stored in the internal memory and sending the parameters to the client terminal 20. As stated above, the timing at which processing for storing parameters in the internal memory is executed and the timing at which processing for sending the parameters stored in the internal memory to the client terminal 20 is executed are asynchronous. Accordingly, regardless of results of processing for sending the parameters to the client terminal 20, processing for storing parameters in the internal memory may be executed. Thus, a series of processing operations for outputting parameters, i.e., a compressed log, such as storing parameters in the internal memory and reading the parameters stored in the internal memory and sending them to the client terminal 20, is accelerated.

The fixed character dictionary 14d stores therein character strings and IDs having a smaller data size than that of the character strings in association with each other. FIG. 4 illustrates an example of the data structure of the fixed character dictionary 14d. In the fixed character dictionary 14d illustrated in FIG. 4, a character string "MSG-ID-00001" and an ID "E1" are registered in association with each other, and a character string "MSG-ID-00002" and an ID "E2" are registered in association with each other.

The storage unit 14 is a storage device, e.g., a hard disk or an optical disc, or a semiconductor memory device, e.g., a flash memory. The storage unit 14 is not restricted to the above-described type of storage device, and may be a random access memory (RAM) or a read only memory (ROM).

The control unit 15 includes an internal memory for storing therein programs which define various processing procedures and control data, and executes various processing operations by using the stored programs and control data. The extracting section 15a, the deployment section 15b, the executing section 15c, and the transmission control section 15d are included in the control unit 15.

Before the deployment of the application 14c, the extracting section 15a extracts definition information written in the form of a message concerning log information from the source code 14a of the application 14c. For example, the extracting section 15a generates a new dictionary ID, and then generates a dictionary 14b in which the generated dictionary ID is registered in the field "dictionary ID". The extracting section 15a then reads the source code 14a. If the extracting section 15a has not yet searched for dictionary registration functions, it searches for the first dictionary registration function from the read source code 14a, and if the extracting section 15a has searched for a dictionary registration function, it searches for the next dictionary registration function from the source code 14a.

As a result of conducting a search, if a dictionary registration function has been obtained, the extracting section 15a extracts special characters from a format string of the obtained dictionary registration function. The extracting section 15a then generates, as a character string to be registered in the "compression format", a delimiter character ",", in which character strings which specify the compression methods of parameters included in the extracted special characters are disposed. Then, the extracting section 15a registers a set of the log ID of the obtained dictionary registration function, the generated character string, and the format string of the obtained dictionary registration function in the dictionary 14b. The extracting section 15a repeatedly executes this registration processing until there is no dictionary registration function as a result of conducting a search. As a result, the dictionary 14b, such as the dictionary illustrated in FIG. 3, is generated.

The deployment section 15b deploys the application 14c on the basis of the source code 14a. For example, the deployment section 15b first compiles the source code 14a so as to generate the application 14c. The deployment section 15b then stores the generated application 14c in the storage unit 14.

In response to an instruction to execute the application 14c from the input unit 11, the executing section 15c reads the dictionary 14b corresponding to the application 14c and executes the application 14c. While being executed by the executing section 15c, the application 14c executes the following processing at the timing at which a parameter, which is compressed log information, is stored in the internal memory. The application 14 executes processing for calling a first log output function and for storing a parameter in the internal memory of the control unit 15. Additionally, while being executed by the executing section 15c, the application 14c executes the following processing at the timing at which a log stored in the internal memory is sent to the client terminal 20. The application 14c executes processing for calling a second log output function and for performing control so that the parameter stored in the internal memory is read and sent to the client terminal 20.

Processing for calling the first log output function and for storing the parameter in the internal memory of the control unit 15 executed by the application 14c will be discussed below. For example, the application 14c first passes, as arguments, a dictionary ID corresponding to the application 14c, parameters to be stored in the internal memory, and a log ID corresponding a format string including special characters corresponding to the parameters to the first log output function. The application 14c also passes, as an argument, a log output destination indicating the ID of a log file into which the parameters are written to the first log output function. For example, the application 14c passes, as arguments, two parameters "12:11:50, January 30, 2012" and "MSG-ID-00001" to the first log output function. In this case, the application 14c passes, as an argument, a log ID "001" corresponding to the format string "<@TIME>: EXECUTION OF <@ID> HAS SUCCEEDED" including special characters <@TIME> and <@ID> corresponding to the two respective parameters.

After calling the first log output function, the application 14c sends to the client terminal 20 an instruction to respond to a question as to whether a log file indicated by the log output destination is stored. Upon receiving such an instruction, the client terminal 20 responds to the application 14c by sending information indicating that the log file indicated by the log output destination is stored to the server 10 if the client terminal 20 stores the log file. If the client terminal 20 does not store the log file, it responds to the application 14c by sending information indicating that the log file indicated by the log output destination is not stored to the server 10.

Upon receiving a response from the client terminal 20, the application 14c determines whether the received response indicates that the log file is stored. If the response indicates that the log file is stored, the application 14c sends the client terminal 20 an instruction to send a dictionary ID registered in the field "dictionary ID" of the log file indicated by the log output destination. Then, upon receiving such an instruction, the client terminal 20 sends the server 10 the dictionary ID registered in the field "dictionary ID" of a log file 24a, which will be discussed later, indicated by the log output destination.

Upon receiving the dictionary ID, the application 14c determines whether the received dictionary ID coincides with the dictionary ID passed to the first log output function as an argument. If the two dictionary IDs do not coincide with each other, the application 14c performs control so that the display unit 12 displays an error message.

If the two dictionary IDs coincide with each other, the application 14c refers to the dictionary 14b represented by the dictionary ID passed to the first log output function. Then, the application 14c specifies the compression methods for parameters included in the specific characters from the character string registered in the field "compression format" of a record of the field "log ID" in which the log ID passed to the first log output function is registered. The application 14c then compresses the parameters.

For example, if the character string registered in the field "compression format" is "TIME", the application 14c executes the following processing. The application 14c calculates the difference between the time embedded in the special character <@TIME> corresponding to the character string "TIME" at a current position and the time embedded in the special character <@TIME> located at the previous position. This will be described below through a specific example. It is assumed that the time embedded in the special character <@TIME> located at the previous position is "12:11:20, January 30, 2012". In this case, if the parameter to be compressed indicates the time "12:11:50, January 30, 2012", the application 14c executes the following processing. The application 14c sets the time value "30", which indicates the time difference (30 seconds), as the parameter indicating the time. In this manner, the time difference value is used as the parameter indicating the time, thereby making it possible to compress the size of the parameter indicating the time.

If the character string registered in the field "compression format" is "ID", the application 14c executes the following processing. The application 14c obtains "ID" corresponding to the parameter of a character string from the fixed character dictionary 14d, and then sets the obtained "ID" as a new parameter, thereby compressing the character string. For example, it is now assumed that a character string "MSG-ID-00001" and an ID "E1" are registered in the fixed character dictionary 14d. In this case, if the parameter passed to the first log output function is the character string "MSG-ID-00001", the application 14c executes the following processing. The application 14c sets the ID "E1" as the parameter indicating the character string. In this manner, the ID is used as the parameter indicating a character string, thereby making it possible to compress the size of the parameter indicating the character string.

If the character string registered in the field "compression format" is "SERIAL_NUMBER", the application 14c executes the following processing. The application 14c calculates the difference between a numeric value embedded in the special character <@SERIAL_NUMBER> corresponding to "SERIAL_NUMBER" at a current position and a numeric value embedded in the special character <@SERI- AL_NUMBER> located at the previous position. This will be described below through a specific example. For example, it is now assumed that a numeric value embedded in the special character <@SERIAL_NUMBER> located at the previous position is "50". In this case, if the parameter passed to the first log output function is "55", the application 14c executes the following processing. The application 14c sets the difference value "5" as the parameter indicating the numeric value. In this manner, the difference value is used as the parameter indicating a numeric value, thereby making it possible to compress the size of the parameter indicating the numeric value.

Then, the application 14c stores the log ID, the dictionary ID, and the log output destination, which have been passed to the first log output function as arguments, and the compressed parameter in the internal memory of the control unit 15 in association with one another.

A description will now be given of processing, executed by the application 14c, for calling the second log output function and for performing control so that a parameter stored in the internal memory is read and sent to the client terminal 20. The application 14c first passes, as an argument, a log ID of log information including a parameter to the second log output function. After calling the second log output function, the application 14c obtains, from the internal memory, the dictionary ID and the log output destination which are associated with the same log ID as the log ID passed to the second log output function as the argument, and also obtains the compressed parameter. The application 14c then performs control so that the obtained dictionary ID, the compressed parameter, and the log ID passed to the second log output function as the argument are sent to the client terminal 20 including a storage unit 24 in which the log file 24a indicated by the obtained log output destination is stored. For example, the application 14c sends the obtained dictionary ID, the compressed parameter, and the log ID passed to the second log output function as the argument, together with an instruction to send them to the client terminal 20, to the communication unit 13. In response to this instruction, the communication unit 13 sends the obtained dictionary ID, the compressed parameter, and the log ID passed to the second log output function as the argument to the client terminal 20.

Every time the dictionary 14b is generated by the extracting section 15a, the transmission control section 15d sends the dictionary 14b, together with an instruction to send the dictionary 14b to the client terminal 20, to the communication unit 13. In response to this instruction, the communication unit 13 sends the dictionary 14b to the client terminal 20.

The control unit 15 is an integrated circuit, such as an application specific integrated circuit (ASIC) or a field programmable gate array (FPGA), or an electronic circuit, such as a central processing unit (CPU) or a micro processing unit (MPU).

Configuration of Client Terminal

The client terminal 20 includes, as illustrated in FIG. 1, an input unit 21, a display unit 22, a communication unit 23, a storage unit 24, and a control unit 25.

The input unit 21 inputs information to the control unit 25. For example, in response to an instruction from a user, the input unit 21 inputs instructions to execute various processing operations to the control unit 25. An example of a device of the input unit 21 is a keyboard or a mouse.

The display unit 22 displays various images. For example, the display unit 22 displays decompressed log information under the control of a display control section 25c, which will be discussed below.

The communication unit 23 performs communication between the client terminal 20 and the server 10. For example, upon receiving a dictionary ID, a compressed parameter, and a log ID from the server 10, the communication unit 23 sends the received dictionary ID, compressed parameter, and log ID to the control unit 25. Additionally, upon receiving the dictionary 14b from the server 10, the communication unit 23 sends the received dictionary 14b to the control unit 25.

The storage unit 24 stores therein various programs executed by the control unit 25. The storage unit 24 also stores therein the log file 24a generated by an obtaining section 25a, which will be discussed later. The storage unit 24 also stores therein the dictionary 14b sent from the server 10 and obtained by the obtaining section 25a. The storage unit 24 also stores therein the same fixed character dictionary 14d as that stored in the storage unit 14 of the server 10.

The log file 24a is a file in which a dictionary ID, a compressed parameter, and a log ID sent from the server 10 are registered in association with one another. FIG. 5 illustrates an example of the data structure of the log file 24a. In the example illustrated in FIG. 5, the log file 24a includes a field "dictionary ID" in which a dictionary ID is registered by using the obtaining section 25a, and fields "log ID" and "parameter". In the fields "log ID" and "parameter", a log ID and a compressed parameter, respectively, are registered by the obtaining section 25a.

The storage unit 24 is a storage device, e.g., a hard disk or an optical disc, or a semiconductor memory device, e.g., a flash memory. The storage unit 24 is not restricted to the above-described type of storage device, and may be a RAM or a ROM.

The control unit 25 includes an internal memory for storing therein programs which define various processing procedures and control data, and executes various processing operations by using the stored programs and control data. The obtaining section 25a, a decompressing section 25b, and the display control section 25c are included in the control unit 25.

The obtaining section 25a obtains various items of information. For example, the obtaining section 25a obtains the dictionary 14b sent from the server 10 through the communication section 23 and stores the obtained dictionary 14b in the storage unit 24.

Upon receiving a dictionary ID, a compressed parameter, and a log ID through the communication unit 23, the obtaining section 25a executes the following processing. The obtaining section 25a first searches the storage unit 24 to determine whether there is a log file 24a in which the obtained dictionary ID is registered in the field "dictionary ID". If the log file 24a has not been found as a result of conducting a search, the obtaining section 25a generates a log file 24a in which the obtained dictionary ID is registered in the field "dictionary ID", and stores the generated log file 24a in the storage unit 24. The obtaining section 25a then registers the obtained compressed parameter and log ID in the fields "parameter" and "log ID", respectively, of the log file 24a.

In contrast, if the log file 24a has been found as a result of conducting a search, the obtaining section 25a adds a new record to the log file 24a and registers the obtained compressed parameter and log ID in the fields "parameter" and "log ID", respectively.

The decompressing section 25b decompresses various items of information. For example, upon receiving an ID of a log file and a log ID specified by a user, the decompressing section 25b executes the following processing. The decompressing section 25b obtains the log file 24a indicated by the ID of the log file specified by the user and obtains the dictionary ID registered in the field "dictionary ID" of the obtained log file 24a. The decompressing section 25b then reads the dictionary 14b indicated by the obtained dictionary ID. Then, the decompressing section 25b calls a log decompression function and executes processing for decompressing log information.

Processing for calling a log decompression function and decompressing log information executed by the decompressing section 25b will be discussed below. The decompressing section 25b passes, as arguments, the ID of a log file and a log ID specified by the user to the log decompression function. After calling the log decompression function, the decompressing section 25b specifies a record in which the log ID passed to the log decompression function as an argument is registered in the field "log ID" from among records of the read dictionary 14b. The decompressing section 25b then specifies a format string registered in the field "decompression format" of the specified record.

For example, if the decompressing section 25b specifies the first record of the dictionary 14b illustrated in FIG. 3, it specifies the format string "<@TIME>:EXECUTION OF <@ID> HAS SUCCEEDED". If the decompressing section 25b specifies the second record of the dictionary 14b illustrated in FIG. 3, it specifies the format string "<@TIME>: EXECUTION OF <@ID> HAS FAILED".

Then, the decompressing section 25b decompresses log information indicated by the log ID which has been passed as the argument, in accordance with the type of parameter corresponding to a special character included in the specified format string.

For example, if the character string included in the special character of the specified format string is "TIME", the decompressing section 25b executes the following processing. The decompressing section 25b first specifies a record in which the log ID passed as an argument is registered in the field "log ID" from among records of the log file 24a indicated by the ID of the log file passed as an argument. The decompressing section 25b then obtains the compressed parameter registered in the field "parameter" of the specified record.

Then, the decompressing section 25b calculates the time by adding the time embedded in the special character <@TIME> located at a position prior to the position of the special character <@TIME> included in the specified format string to the value indicated by the obtained parameter. This will be described below through a specific example. For example, it is now assumed that the time embedded in the special character <@TIME> located at the previous position is "12:11:20, January 30, 2012". In this case, if the value of the obtained parameter indicates "30", the decompressing section 25b executes the following processing. The decompressing section 25b adds "30" seconds to the time "12:11:20, January 30, 2012" so as to calculate "12:11:50, January 30, 2012". With this processing, the compressed parameter "30" is decompressed, and the time "12:11:50, January 30, 2012" is obtained.

If the character string included in the special character of the specified format string is "ID", the decompressing section 25b executes the following processing. The decompressing section 25b first specifies a record in which the log ID passed to the log decompression function as an argument is registered in the field "log ID" from among records of the log file 24a indicated by the ID of the log file passed to the log decompression function as an argument. The decompressing section 25b then obtains the compressed parameter registered in the field "parameter" of the specified record.

Then, the decompressing section 25b obtains the character string corresponding to the ID of the obtained parameter from the fixed character dictionary 14d. This will be described below through a specific example. For example, it is now assumed that the character string "MSG-ID-00001" and the ID "E1" are registered in the fixed character dictionary 14d. In this case, if the ID of the obtained parameter is "E1", the decompressing section 25b executes the following processing. The decompressing section 25b obtains the character string "MSG-ID-00001" corresponding to the ID "E1" from the fixed character dictionary 14d. With this processing, the compressed parameter "E1" is decompressed, and the character string "MSG-ID-00001" is obtained.

Thereafter, the decompressing section 25b converts a special character included in the specified format string into the decompression result of the compressed parameter, thereby decompressing log information. For example, it is now assumed that the format string specified by the decompressing section 25b is "<@TIME>:EXECUTION OF <@ID> HAS SUCCEEDED". In this case, the decompressing section 25b converts the special character <@TIME> included in the format string into the calculated time "12:11:50, January 30, 2012" and converts the special character <@ID> into the obtained character string "MSG-ID-00001". As a result, the decompressing section 25 decompresses log information indicated by the specified log ID so as to obtain log information that "12:11:50, January 30, 2012: EXECUTION OF MSG-ID-00001 HAS SUCCEEDED". In this manner, the decompressing section 25b decompresses log information.

If the character string included in the special character of the specified format string is "SERIAL_NUMBER", the decompressing section 25b executes the following processing. The decompressing section 25b first specifies a record in which the log ID passed to the log decompression function as an argument is registered in the field "log ID" from among records of the log file 24a indicated by the ID of the log file passed to the log decompression function as an argument. The decompressing section 25b then obtains the compressed parameter registered in the field "parameter" of the specified record.

Then, the decompressing section 25b calculates a numeric value by adding a numeric value embedded in the special character <@SERIAL_NUMBER> located at a position prior to the position of the special character <@SERIAL_NUMBER> included in the specified format string to the numeric value indicated by the obtained parameter. This will be described below through a specific example. For example, it is now assumed that the numeric value embedded in the special character <@SERIAL_NUMBER> located at the previous position is "50". In this case, if the numeric value of the obtained parameter indicates "5", the decompressing section 25b executes the following processing. The decompressing section 25b calculates "55" by adding "5" to "50". With this processing, the compressed parameter "5" is decompressed, and the numeric value "55" is obtained. Then, the decompressing section 25b converts the special character <@SERIAL_NUMBER> included in the specified format string into the calculated value, thereby decompressing log information.

The display control section 25c performs control so that the display unit 22 displays log information decompressed by the decompressing section 25b. The display unit 22 then displays the decompressed log information.

The control unit 25 is an integrated circuit, such as an ASIC or an FPGA, or an electronic circuit, such as a CPU or an MPU.

Processing Flow

Figure 6:
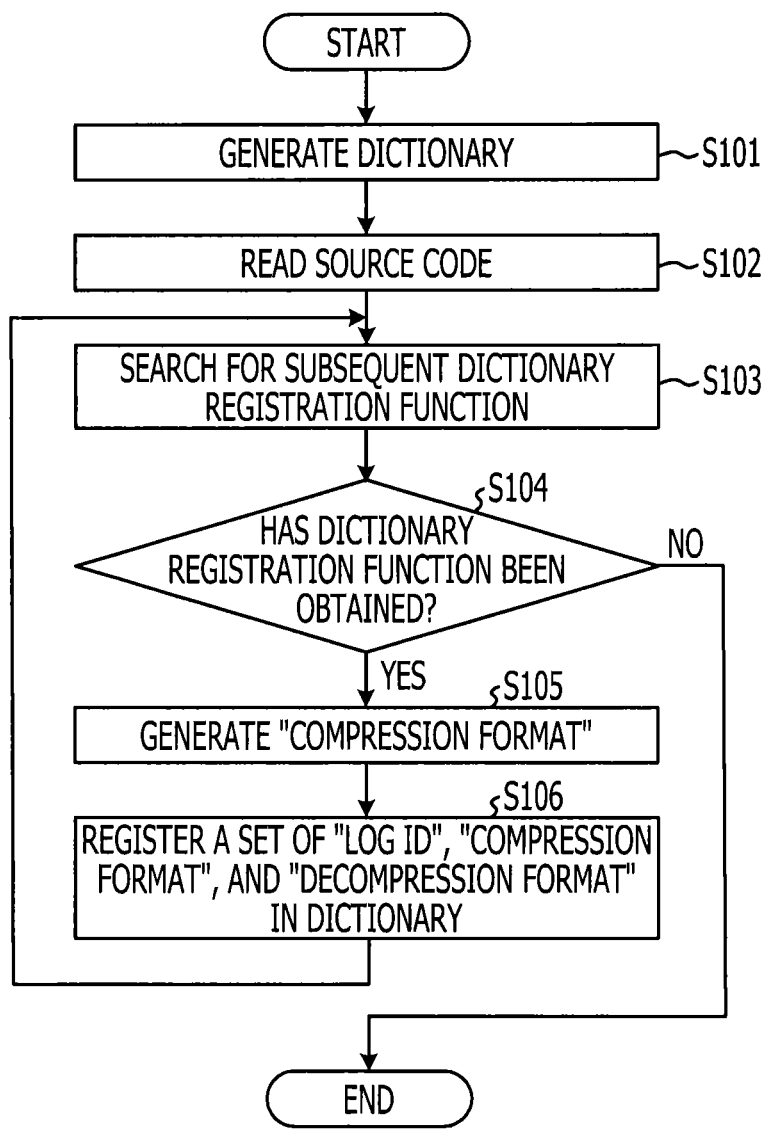
FIG. 6 is a flowchart illustrating generation processing according to an embodiment.

Flows of processing operations executed by the server 10 according to this embodiment will be described below. FIG. 6 is a flowchart illustrating generation processing according to this embodiment. Concerning the timing at which this generation processing is executed, various possibilities may be considered. For example, the generation processing may be executed when the control unit 15 receives an instruction to execute the generation processing sent from the input unit 11.

As illustrated in FIG. 6, in step S101, the extracting section 15a generates a new dictionary ID and generates the dictionary 14b in which the generated dictionary ID is registered in the field "dictionary ID". Then, in step S102, the extracting section 15a reads the source code 14a. Then, in step S103, if the extracting section 15a has not yet searched for dictionary registration functions, it searches for the first dictionary registration function from the read source code 14a, and if the extracting section 15a has searched for a dictionary registration function, it searches for the next dictionary registration function from the source code 14a. In step S104, the extracting section 15a determines whether a dictionary registration function has been obtained.

If a dictionary registration function has been obtained as a result of conducting a search (i.e., if the result of step S104 is YES), the process proceeds to step S105. In step S105, the extracting section 15a extracts a special character from a format string of the obtained dictionary registration function. The extracting section 15a then generates, as a character string to be registered in the "compression format", a delimiter character "," in which character strings which specify the compression methods of parameters included in the extracted special characters are disposed. Then, in step S106, the extracting section 15a registers a set of the log ID of the obtained dictionary registration function, the generated character string, and the format string of the obtained dictionary registration function in the dictionary 14b. The process then returns to step S103. If a dictionary registration function has not been obtained as a result of conducting a search (i.e., if the result of step S104 is NO), the processing is terminated.

Figure 7:
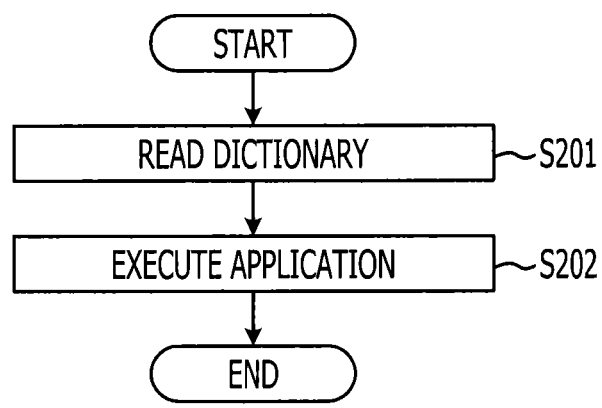
FIG. 7 is a flowchart illustrating execution processing according to an embodiment.

FIG. 7 is a flowchart illustrating execution processing according to this embodiment. Concerning the timing at which this execution processing is executed, various possibilities may be considered. For example, the execution processing may be executed when the control unit 15 receives an instruction to execute the execution processing sent from the input unit 11.

As illustrated in FIG. 7, in step S201, the executing section 15c reads the dictionary 14b corresponding to the application 14c instructed to be executed. Then, in step S202, the executing section 15c executes the application 14c and finishes the processing.

Figure 8:
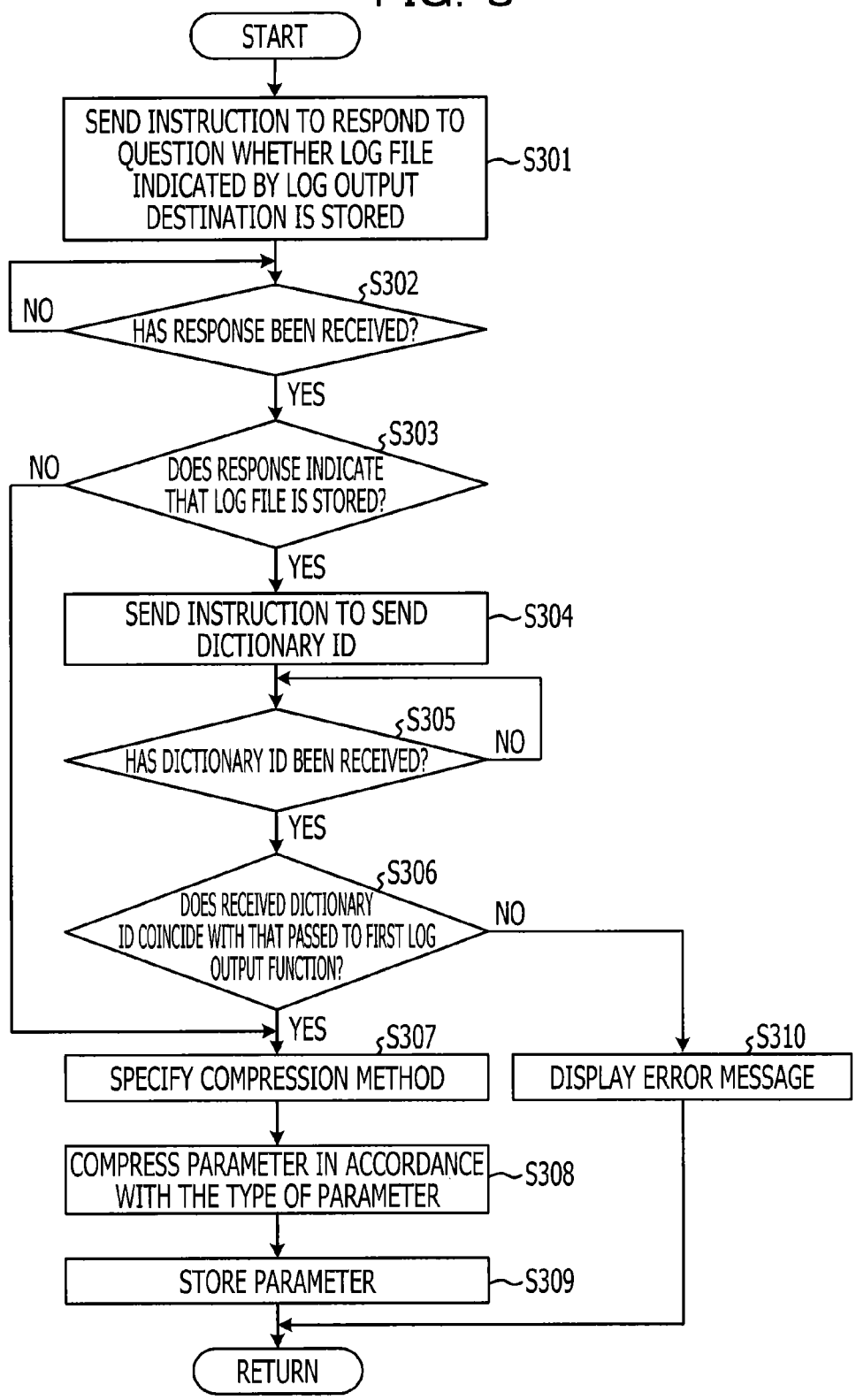
FIG. 8 is a flowchart illustrating processing, executed by an application, for calling a first log output function and storing a parameter in an internal memory of a control unit according to an embodiment.

FIG. 8 is a flowchart illustrating processing, executed by the application 14c, for calling a first log output function and storing a parameter in an internal memory of the control unit 15 according to this embodiment.

As illustrated in FIG. 8, in step S301, after calling the first log output function, the application 14c sends the client terminal 20 an instruction to respond to a question as to whether a log file indicated by a log output destination is stored. Then, in step S302, the application 14c determines whether a response from the client terminal 20 has been received. If a response has not been received (i.e., if the result of step S302 is NO), the application 14c makes a determination of step S302 again.

If a response has been received (i.e., if the result of step S302 is YES), the process proceeds to step S303. The application 14c determines in step S303 whether the received response indicates that the log file indicated by the log output destination is stored. If the received response does not indicate that the log file is stored (i.e., if the result of step S303 is NO), the process proceeds to step S307. If the received response indicates that the log file is stored (i.e., if the result of step S303 is YES), the process proceeds to step S304. In step S304, the application 14c sends the client terminal 20 an instruction to send a dictionary ID registered in the field "dictionary ID" of the log file indicated by the log output destination. The application 14c then determines in step S305 whether a dictionary ID has been received from the client terminal 20. If a dictionary ID has not been received (i.e., if the result of step S305 is NO), the application 14c makes a determination of step S305 again.

If a dictionary ID has been received (i.e., if the result of step S305 is YES), the process proceeds to step S306. In step S306, the application 14c determines whether the received dictionary ID coincides with the dictionary ID passed to the first log output function as an argument. If the two dictionary IDs do not coincide with each other (i.e., if the result of step S306 is NO), the process proceeds to step S310. In step S310, the application 14c performs control so that the display unit 12 displays an error message. The application 14c then stores the processing result in the internal memory and then returns.

If the two dictionary IDs coincide with each other (i.e., if the result of step S306 is YES), the process proceeds to step S307. In step S307, the application 14c refers to the dictionary 14b indicated by the dictionary ID passed to the first log output function as an argument. The application 14c then specifies the compression method for a parameter included in a specific character from a character string registered in the field "compression format" of a record corresponding to the field "log ID" in which the log ID passed to the first log output function is registered. In step S308, the application 14c compresses the parameter by using the specified compression method.

Then, in step S309, the application 14c stores the log ID, dictionary ID, and log output destination passed to the first log output function as arguments, and the compressed parameter in the internal memory of the control unit 15 in association with one another. The application 14c then returns.

Figure 9:
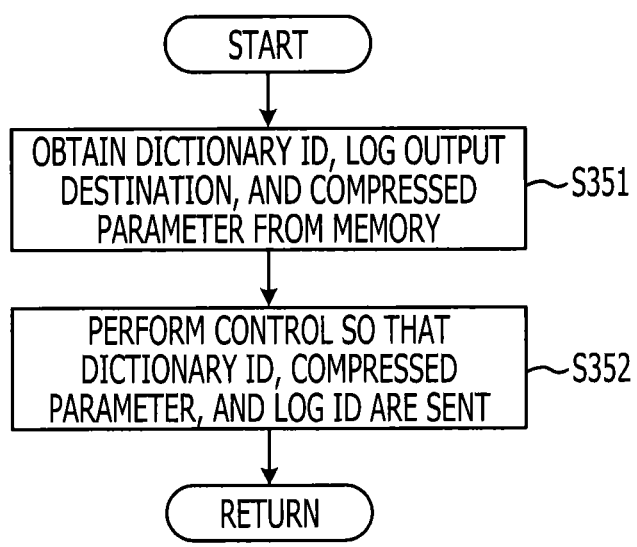
FIG. 9 is a flowchart illustrating processing, executed by an application, for calling a second log output function and performing control so that a parameter stored in the internal memory is read and sent to a client terminal according to an embodiment.

FIG. 9 is a flowchart illustrating processing, executed by the application 14c, for calling the second log output function and performing control so that a parameter stored in the internal memory is read and sent to the client terminal 20 according to this embodiment.

As illustrated in FIG. 9, after calling the second log output function, the application 14c executes the following processing. In step S351, the application 14c obtains the dictionary ID and log output destination corresponding to the same log ID as the log ID passed to the second log output function as an argument, and the compressed parameter from the internal memory. Then, in step S352, the application 14c performs control so that the obtained dictionary ID, the compressed parameter, and the log ID passed to the second log output function as an argument are sent to the client terminal 20. That is, the application 14c performs control so that the dictionary ID, parameter, and log ID are sent to the client terminal 20 including the storage unit 24 in which the log file 24a indicated by the obtained log output destination is stored. The application 14c then returns.

Figure 10:
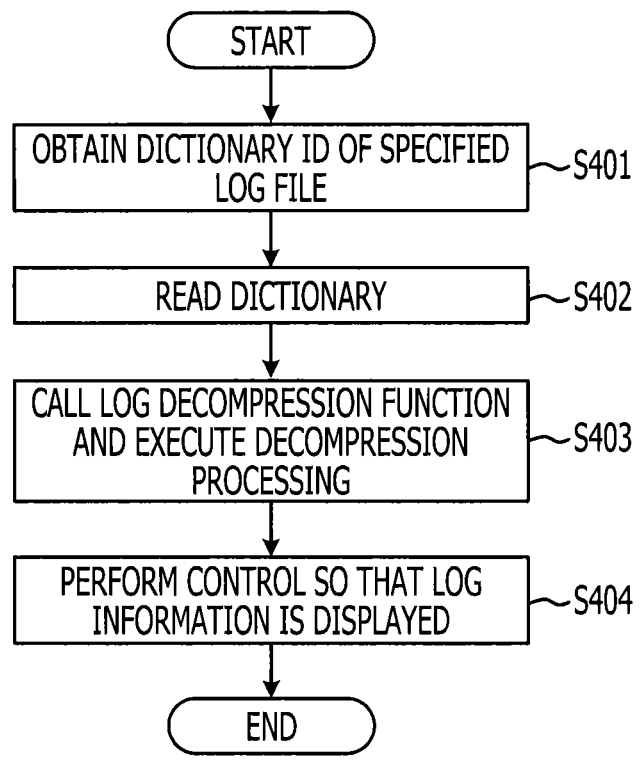
FIG. 10 is a flowchart illustrating display control processing according to an embodiment.

Flows of processing operations executed by the client terminal 20 according to this embodiment will be described below. FIG. 10 is a flowchart illustrating display control processing according to this embodiment. The display control processing is executed, for example, when the control unit 25 has received an instruction to execute the display control processing from the input unit 21. Such an instruction includes an ID of a log file and a log ID specified by a user.

As illustrated in FIG. 10, in step S401, the decompressing section 25b obtains the log file 24a indicated by the ID of the log file specified by the user and obtains the dictionary ID registered in the field "dictionary ID" of the obtained log file 24a. Then, in step S402, the decompressing section 25b reads the dictionary 14b indicated by the obtained dictionary ID. Then, in step S403, the decompressing section 25b calls the log decompression function and executes processing for decompressing log information. Thereafter, in step S404, the display control section 25c performs control so that the display unit 22 displays log information decompressed by the decompressing section 25b.

Figure 11:
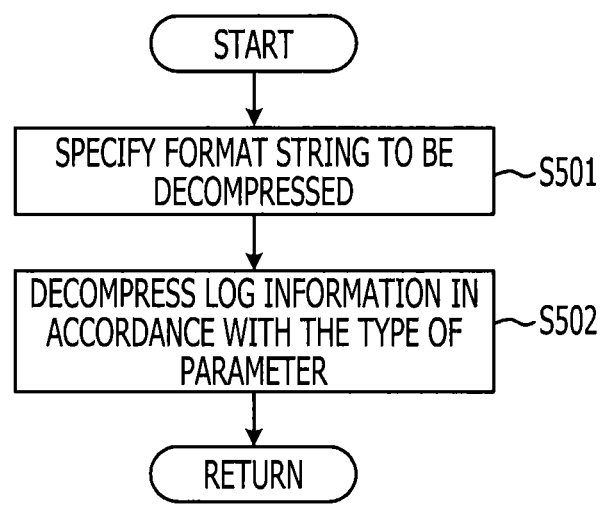
FIG. 11 is a flowchart illustrating processing, executed by a decompressing section, for calling a log decompression function and decompressing log information according to an embodiment.

FIG. 11 is a flowchart illustrating processing, executed by the decompressing section 25b, for calling a log decompression function and decompressing log information according to this embodiment. In step S501, after calling the log decompression function, the decompressing section 25b specifies a record in which the log ID passed to the log decompression function as an argument is registered in the field "log ID" from among records of the dictionary 14b. The decompressing section 25b then specifies a format string registered in the field "decompression format" of the specified record.

Then, in step S502, the decompressing section 25b decompresses the log information indicated by the log ID passed to the log decompression function as an argument in accordance with the type of parameter corresponding to a special character included in the specified format string, and then returns.

Advantages

As described above, in the log management system 1 of this embodiment, before the deployment of the application 14c which compresses and outputs log information, the server 10 extracts definition information written in the form of a message concerning log information from the source code 14a of the application 14c. The server 10 then deploys the application 14c on the basis of the source code 14a. Then, upon receiving log information, the client terminal 20 outputs the log information in the form of a message on the basis of definition information. That is, in the log management system 1 of this embodiment, log information output from the application 14c is output in the form of a message in accordance with definition information extracted from the source code 14a. It is thus possible to reduce a delay in log output processing in the log management system 1.

Additionally, in the server 10 of this embodiment, a compressed parameter is stored in an internal memory, and the compressed parameter stored in the internal memory is output. Accordingly, in the server 10, a dictionary is not stored, together with a parameter, in the internal memory, which would otherwise consume the space of the internal memory.

In the server 10 of this embodiment, instead of the entirety of log information, a parameter, which is part of log information, is compressed and output. It is thus possible to reduce a delay in log output processing, as stated above.

The log management system has been discussed through the above-described embodiment, and it may be implemented through various other modes. Accordingly, other embodiments will be described below.

In the processing operations described in the above-described embodiment, all of or some of the processing operations which are executed automatically may be executed manually.

Moreover, the individual steps of each of the processing operations discussed in the above-described embodiment may be divided into greater details or may be integrated together, or some steps may be omitted, depending on various loads and conditions of use.

The order of the steps of each of the processing operations discussed in the above-described embodiment may be changed, depending on various loads and conditions of use.

The components of the log management system 1 are illustrated on the basis of the functional concept. The components don't have to be physically configured, as illustrated in the drawings. That is, the specific state in which the components are divided or integrated is not restricted to that illustrated in the drawings, and all of or some of the components may be divided or integrated physically or functionally in a certain number of groups, depending on various loads and conditions of use.

Extracting Program

The processing operations performed by the server 10 discussed in the above-described embodiment may be implemented by executing a program, which is prepared in advance, in a computer system, such as a personal computer or a workstation. Accordingly, an example of a computer that executes an extracting program having functions similar to those of the server 10 will be described below with reference to FIG. 12.

Figure 12:
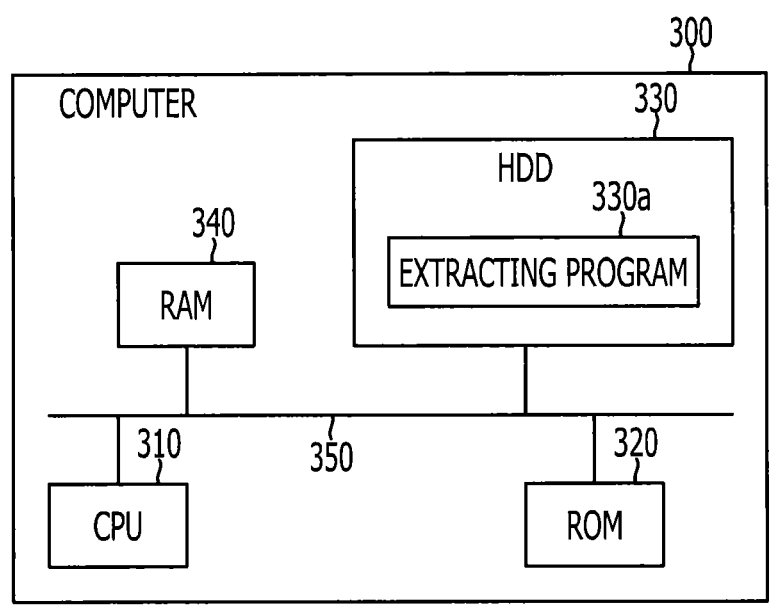
FIG. 12 illustrates a computer that executes an extracting program.

FIG. 12 illustrates a computer 300 that executes an extracting program. The computer 300 includes, as illustrated in FIG. 12, a CPU 310, a ROM 320, a hard disk drive (HDD) 330, and a RAM 340. The CPU 310, the ROM 320, the HDD 330, and the RAM 340 are connected to one another via a bus 350.

In the HDD 330, an extracting program 330a having functions similar to the extracting section 15a, the deployment section 15b, the executing section 15c, and the transmission control section 15d described in the above-described embodiment is stored in advance. The extracting program 330a may be separated at a suitable time.

The CPU 310 reads the extracting program 330a from the HDD 330 and executes it.

In the HDD 330, a source code, a dictionary, an application, and a fixed character dictionary are stored. The source code, the dictionary, the application, and the fixed character dictionary correspond to the source code 14a, the dictionary 14b, the application 14c, and the fixed character dictionary 14d, respectively.

The CPU 310 reads the source code, the dictionary, the application, and the fixed character dictionary from the HDD 330 and stores them in the RAM 340. The CPU 310 also executes the extracting program 330a by using the source code, the dictionary, the application, and the fixed character dictionary stored in the RAM 340. Not all of the above-described data items are stored in the RAM 340, and only data items used for executing processing may be stored in the RAM 340.

The above-described extracting program 330a might not be initially stored in the HDD 330.

For example, the extracting program 330a may be stored in a portable physical medium, such as a flexible disk (FD), a compact disc-read only memory (CD-ROM), a digital versatile disc (DVD), a magneto-optical disk, or an IC card, which may be inserted into the computer 300. Then, the computer 300 may read the extracting program 330a from such a portable physical medium and execute it.

Alternatively, the extracting program 330a may be stored in another computer (or a server), which may be connected to the computer 300 via a public line, the Internet, a local area network (LAN), or a wide area network (WAN). Then, the computer 300 may read the extracting program 330a from such a computer (or a server) and execute it.

Decompressing Program

The processing operations performed by the client terminal 20 discussed in the above-described embodiment may be implemented by executing a program, which is prepared in advance, in a computer system, such as a personal computer or a workstation. Accordingly, an example of a computer that executes a decompressing program having functions similar to those of the client terminal 20 will be described below with reference to FIG. 13.

Figure 13:
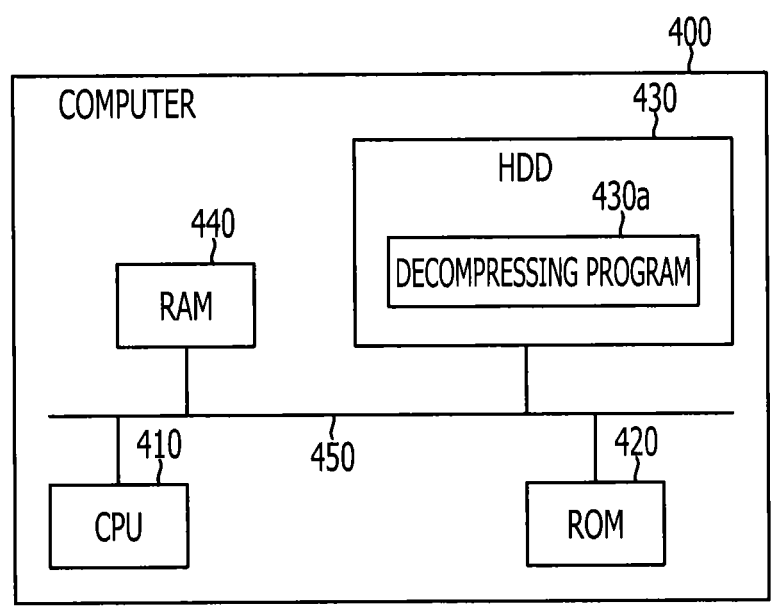
FIG. 13 illustrates a computer that executes a decompressing program.

FIG. 13 illustrates a computer 400 that executes a decompressing program. The computer 400 includes, as illustrated in FIG. 13, a CPU 410, a ROM 420, an HDD 430, and a RAM 440. The CPU 410, the ROM 420, the HDD 430, and the RAM 440 are connected to one another via a bus 450.

In the HDD 430, a decompressing program 430a having functions similar to the obtaining section 25a, the decompressing section 25b, and the display control section 25c described in the above-described embodiment is stored in advance. The decompressing program 430a may be separated at a suitable time.

The CPU 410 reads the decompressing program 430a from the HDD 430 and executes it.

In the HDD 430, a log file, a dictionary, and a fixed character dictionary are stored. The log file, the dictionary, and the fixed character dictionary correspond to the log file 24a, the dictionary 14b, and the fixed character dictionary 14d, respectively.

The CPU 410 reads the log file, the dictionary, and the fixed character dictionary from the HDD 430 and stores them in the RAM 440. The CPU 410 also executes the decompressing program 430a by using the log file, the dictionary, and the fixed character dictionary stored in the RAM 440. Not all of the above-described data items are stored in the RAM 440, and only data items used for executing processing may be stored in the RAM 440.

The above-described decompressing program 430a might not be initially stored in the HDD 430.

For example, the decompressing program 430a may be stored in a portable physical medium, such as an FD, a CD-ROM, a DVD, a magneto-optical disk, or an IC card, which may be inserted into the computer 400. Then, the computer 400 may read the decompressing program 430a from such a portable physical medium and execute it.

Alternatively, the decompressing program 430a may be stored in another computer (or a server), which may be connected to the computer 400 via a public line, the Internet, a LAN, or a WAN. Then, the computer 400 may read the decompressing program 430a from such a computer (or a server) and execute it.

According to the above-described embodiments, it is possible to reduce a delay in log output processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A log management method comprising:
   extracting, before deploying an application definition information defining specific descriptions for explaining execution results of the application and ways in which the execution results are tied to the specific descriptions, from source code of the application;
   deploying the application in a first device;
   associating, by the first device, the execution results with an identifier identifying the definition information instead of tying the specific descriptions when executing the application;
   obtaining the execution results associated with the identifier by a second device that is to access log information of the application;
   tying, by the second device, the obtained execution results to one of the specific descriptions on the basis of the way defined in the definition information that is separately obtained on the basis of the identifier associated with the obtained execution results; and
   accessing, by the second device, the obtained execution results tied to the one of the specific descriptions as the log information of the application.

2. A log management system comprising:
   a first device comprising a first processor which executes a first procedure, the first procedure comprising:
      extracting, before deploying an application definition information defining specific descriptions for explaining execution results of the application and ways in which the execution results are tied to the specific descriptions, from source code of the application;
      deploying the application in the first device;
      associating, by the first device the execution results with an identifier identifying the definition information instead of tying the specific descriptions when executing the application, and
   a second device including a second processor which executes a second procedure, the second procedure comprising:
      obtaining the execution results associated with the identifier by the second device that is to access the log information of the application;
      tying, by the second device, the obtained execution results to one of the specific descriptions on the basis of the way defined in the definition information that is separately obtained on the basis of the identifier associated with the obtained execution results; and
      accessing, by the second device, the obtained execution results tied to the one of the specific descriptions as the log information of the application.

3. An information processing apparatus comprising:
   a processor which executes a procedure comprising:
      extracting, before deploying an application definition information defining specific descriptions for explaining execution results of the application and way in which the execution results are tied to the specific descriptions, from source code of the application;
      deploying the application in a first device;
      associating, by the first device, the execution results with an identifier identifying the definition information instead of tying the specific descriptions when executing the application;
      obtaining the execution results associated with the identifier by a second device that is to access log information of the applications;

tying, by the second device, the obtained execution results to one of the specific descriptions on the basis of the way defined in the definition information that is separately obtained on the basis of the identifier associated with the obtained execution results; and accessing, by the second device, the obtained execution result tied to the one of the specific descriptions as the log information of the application.

* * * * *